April 2, 1946.  B. C. GRIEB  2,397,735
COUPLING DEVICE
Filed April 7, 1942
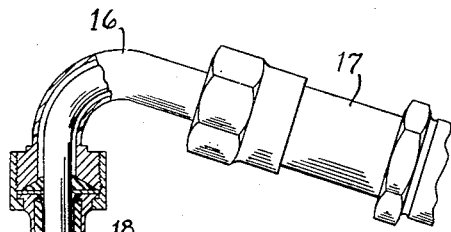
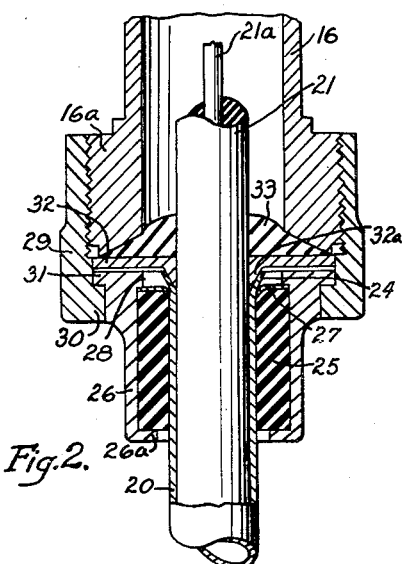
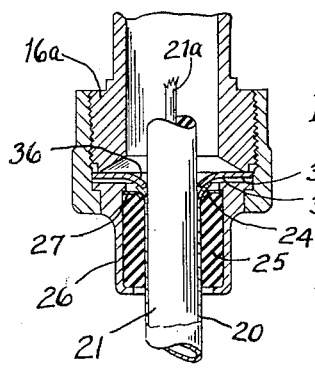
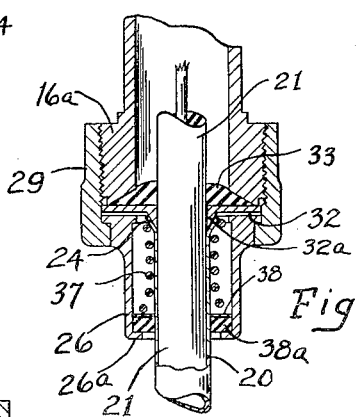
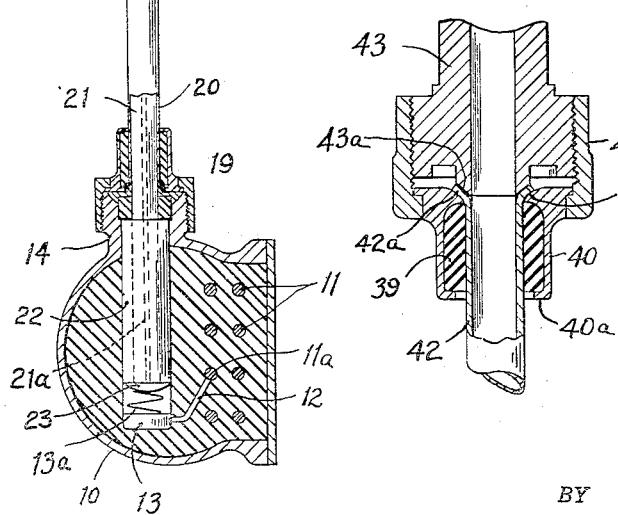
INVENTOR
B. Curtis Grieb
BY Harris S. Campbell
ATTORNEY

UNITED STATES PATENT OFFICE 2,397,735

COUPLING DEVICE

Benjamin Curtis Grieb, Chestnut Hill, Pa., assignor to Air-Shields, Incorporated, Bucks County, Pa., a corporation of Delaware Application April 7, 1942, Serial No. 437,981

15 Claims. (Cl. 174—89)

This invention relates to connector or coupling devices for making a connection for tubular parts. The invention is particularly concerned with the provision of suitable connections for use in cases where vibration occurs such as in shielded electrical cable, oil or fuel lines for internal combustion engines.

In engine installations of various types, for example in motor vehicles and aircraft, great difficulty has been experienced with terminals for metal tubes used in association with the engine, due to the tendency for such terminals or couplings to impose an undue stress in the tubing at the point of connection when vibration is present. The vibratory motions of the engine are transmitted to the tube and cause repeated bending stresses. This action causes embrittlement of the material near the point of connection with the result that failure occurs after a period of operation. The length of time required to cause failure varies with different conditions such as the severity of the vibration, the length of the tubing being supported, the rigidity of the end connection, the proportions of the tubing and of the coupling part, etc.

In some installations such as in aircraft, power boats and the like, where a high-powered, light weight internal combustion engine is being used, the vibration encountered is severe, particularly since the engines are often mounted in rubber. This permits greater amplitude of movement. In such installations, especially in aircraft where the weight of ignition shielding, oil lines and the like, must be kept a minimum, the problem of material crystallization and early failure of tubular members becomes increasingly difficult. The present invention provides a construction which greatly lengthens the life of such tubular members, especially in cases where the member has a thin wall.

In most types of terminals it is customary to have a metal part of considerable bulk and thickness encircling the tubular member at its end and in direct contact therewith. Even when the terminal part is tapered in wall thickness, a definite change in cross section occurs at the point where the tubular member enters the terminal fitting. This sudden change in cross section provides a point where fatigue stresses rapidly break down the resistance of the metal and a crack develops. It is one of the chief objects of the present invention to eliminate this critical point of embrittlement by providing a terminal connection which supports the end of the tubular member in a fashion such that no sudden change in stress occurs. This is accomplished by the use of a resilient member of considerable length in contact with the tubular member in a fashion so that the resilient member provides good support for the tubular element but does not produce any sharply defined terminating point of support.

Another object of the invention is to provide a suitable terminal coupling device for a shielded electrical conductor such as an ignition cable, which shielded conductor incorporates a thin walled metal casing around the insulated conductor.

It is also an object of the invention to provide an electrical shielding terminal which is also moisture proof and at the same time provides completely effective shielding.

How the foregoing and other objects and advantages are attained will be clear from the description of the drawing in which—

Figure 1 is an elevational view showing a portion of an ignition system which illustrates the use of the terminal construction of the present invention.

Figure 2 is an enlarged view of the upper terminal assembly of Figure 1.

Figure 3 is an alternative form which the terminal may take.

Figure 4 illustrates another embodiment of the invention.

Figure 5 illustrates the invention as applied to a pressure type tube connection.

Figure 1 illustrates a portion of a shielded high tension ignition system employing the improved terminal couplings of the present invention. The portion of the system shown is a typical arrangement for application to an aircraft or similar engine. The circular cross section illustrated at 10 shows a section through a large tubular metal manifold through which the conductors leading from the magnetos to the spark plugs are passed. The different conductors are indicated at 11, these being embedded in an insulating material which fills the inside of the manifold tube 10. This type of manifold for aircraft engine ignition systems is well known in the art and is not part of the present invention per se. It is illustrated chiefly for the purpose of indicating a typical example for the use of my improved coupling. From conductor 11a a lead 12 runs to a contact 13 which is located at the branch outlet boss 14. From the boss 14 a shielded conductor 15 leads to an elbow fitting 16 which in turn is connected to the spark plug 17. The spark plug will, of course, be mounted at the top end of one of the engine cylinders (not shown).

Couplings according to the present invention are shown at 18 and 19, at each end of the shielded lead 15. The shielded conductor 15 has a thin-walled metal tubular covering 20 and an insulated conductor 21. At the lower end the conductor 21 extends beyond the end of the metal casing 20 into the insulating terminal 22, the conductor 21a being connected with a metal contact plate 23 at the lower end of insulator 22. Electrical contact is provided between contact plate 23 and contact 13 through spring 13a.

Since the terminal couplings 18 and 19 are essentially the same construction only one of these will be described in detail. The terminal 18 is shown in Figure 2 to a larger scale. The end of the shielding tube 20 is flanged or flared slightly at 24. This provides the means by which the conductor is supported in proper longitudinal position. Surrounding tube 20 is a cylindrical collar 25 of resilient material such as artificial rubber, although other satisfactory materials having suitable resiliency may be used. A tubular metal housing 26 is provided to enclose and support the collar 25. A thin resilient dished washer 27 is supported by flange 28 of the housing 26. This washer makes contact with the flared part 24 of shielding 20 and thus insures positive electrical contact between the shielding and the coupling.

Due to the resilient nature of the washer 27 and also the fact that it is held against the flare 24 by means of the pressure from the resilient collar 25 there is no rigidly clamped connection to the thin shielding tube 20. In order to provide a connection to the fitting 16 a connector nut 29 having an internal thread is provided. This nut 29 has an inwardly directed flange 30 which contacts the external flange 31 of the fitting 26 to provide the means for connecting the assembly to the enlarged threaded end 16a of the fitting 16. To further ensure proper electrical contact and support for the shielding casing 20 a special washer 32 is provided. As illustrated in Figure 2, one surface of washer 32 is flattened and seats against a resilient sealing washer 33 which is in contact with the terminal 16a. At the other side of the washer 32 is a tapered lip 32a which is adapted to contact the inside surface of the flared end 24. This lip 32a thus provides a suitable surface against which the flared end of the casing 20 is urged when the coupling is assembled in position.

The assembly of the terminal and its mounting on the conductor may be accomplished as follows. The resilient collar 25 is preferably proportioned with a normal inside diameter the same as the diameter of the tubular member 20. The outside diameter of the collar 25 is slightly greater than the inside diameter of the housing 26. The housing 26 is made with the flange 28 machined in place. The flange 26a, however, is not machined into the housing, this end of the housing 26 being left open. The thin washer 27 is placed in position and then the resilient collar 25 is forced into place in the housing after which the flange 26a is rolled over to provide the complete housing assembly.

The process of forcing the collar 25 which has a slightly larger diameter than the inside of the housing 26, causes the inside diameter of the collar to be reduced slightly due to the compression in the rubber-like material. When the tubing 20 of the shielded conductor is inserted through the hole in the collar 25, a tight sealing fit is obtained.

The flared end 24 is made after the terminal assembly has been slid onto the tube 20. This flared end is made with a suitable tool in a fashion well known in the art. After the flared end 24 has been finished the assembly is ready for connecting to the fitting 16a.

Figure 3 shows a modified form of terminal connection, the chief difference from that shown in Figure 2 is in the construction of the washer member associated with the elbow fitting terminal 16a. In Figure 3 a washer member 34 is illustrated, which is made with a flat portion 35 to contact the end of terminal 16a and a dished portion 36 which is made with a suitable angle to engage the inside of the flare 24. This washer 34 is proportioned to provide a considerable degree of resilience and acts in the capacity of a spring washer.

Another variation of the present invention is illustrated in Figure 4. In this case instead of the collar of resilient material 25 to provide the resilient support for the shielding tube 20, a coiled spring 37 is provided which is shaped to fit closely around the tube 20 and against the flared portion 24. The other end of the element 37 is enlarged to bear against washer 38. Seal 38a is used to prevent entrance of moisture. A washer 32 similar to that shown in Figure 2 having the tapered projection 32a is provided to contact the inside of the flange or flare 24. Spring 37 also gives good electrical contact between the casing 20 and the housing member 26.

Figure 5 illustrates the improved coupling device applied to a pressure or fluid carrying tube connection. In this case the resilient collar 39 is retained inside the terminal member 40 in a fashion somewhat similar to that shown in Figures 2 and 3. The housing part 40 is provided with a rounded or tapered surface 41 adapted to contact the flare end 42a of the tube 42. Terminal fitting 43 is provided with a suitably shaped internal surface 43a for contacting the inside of the flare 42a. The threaded nut 44 is used to make the connection to the terminal fitting 43 and clamp the parts together. The surfaces 41 and 43a thus securely seat themselves on the flange 42a and provide a pressure tight joint. The resilient collar 39 supports the tube 42 all the way from the end 40a of the housing part 40 to the flare so that a gradually increased restraint is applied to the end of the tube 42 with no sharply defined change in section at the point of beginning of the restraint.

The type of shielded conductor shown in the drawing has a thin-wall metal shielding tube which fits closely to the insulated conductor. It will be obvious, however, that my improved type of resilient connector may be used with other forms of casings used for shielding purposes. In most terminal constructions it is customary to provide a metal reinforcing sleeve in contact with the tube. Usually a crack develops in the part of the tube associated with the terminal fitting after a period of service. Tests have indicated that my improved construction increases the life of a tube connection a great many times as compared with normal terminals. For example, accelerated test data indicates an increase in life of 30 to 40 times that of previous shielding coupling constructions.

From the foregoing it will be seen that I have provided a greatly improved coupling for tubular members associated with engines. By the use of the resilient supporting collar in the coupling a positive moisture proof seal is provided which constitutes a further improvement over previous types of couplings for use with shielded conductors. My improved coupling is simple to manufacture and provides reduced replacement requirements and less service work especially in connection with engine electrical system maintenance. It should be noted that a coupling having the features disclosed eliminates a torque strain on the flared tube end since the housing does not rotate, the connection being made by a separate threaded part. The resilient nature of the connection prevents undue clamping pressure, which would result in reducing the wall thickness, from being applied to the flared end.

I claim:

1. For an ignition system, an insulated electrical wire, a metal shielding cover surrounding said wire, a terminal support for said cover including a portion of the end of said cover having an enlarged diameter, an annular metal sleeve, a hole in said sleeve through which the electrical wire projects and having a greater diameter than the enlarged end portion of said cover, a resilient cylindrical element mounted inside said metal sleeve and contacting the outside of said metal cover, a metal disc member having a central hole of sufficient diameter to accommodate said electrical wire, said disc member having a conical shaped portion adapted to contact the inside of the enlarged portion of said cover, a flexible metal diaphragm adapted to contact the outside of said cover and said annular sleeve, and threaded means whereby said disc is urged toward said annular sleeve during the operation of connecting said terminal.

2. For an electrical shielded wire adapted for use in a position where severe vibration is encountered, a metallic shielding jacket, a terminal including an annular metal sleeve in spaced relationship to said shielding, an annular resilient element proportioned to fit tightly inside said sleeve and around said shielding, a flexible metallic diaphragm adapted to provide an electrical contact between said sleeve and said jacket, and a metallic disc having a lip adapted to contact the end of said jacket.

3. For a shielded electrical system, an insulated electrical conductor, a metal covering therefor, a connector for said covering having a cylindrical resilient part surrounding a portion of said covering, a flared end on said covering, a metal sleeve surrounding said cylindrical part and having an inwardly turned flange at each end, a metallic flexible diaphragm adapted to contact the outside of said flared end and said sleeve, and a threaded member in contact with said sleeve.

4. For a shielded electrical system, an insulated conductor, a metal shielding casing surrounding said conductor, a connecting terminal for said casing having a collar of resilient material, a flanged end on said casing, a metal cylinder around said collar, a thin flexible metallic washer located in contact with the end of said collar, and also in contact with said cylinder and said flanged end, a circular shaped disc part having a central opening to allow the insulated conductor to pass through and a portion shaped to fit against said flanged end, a fitting to which said connecting terminal is to be attached, threaded means for effecting the connection.

5. For a shielded electrical system, an insulated conductor, a metal shielding casing surrounding said conductor, a connecting terminal for said casing having a collar of resilient material, a flanged end on said casing, a metal cylinder around said collar, a thin metallic washer located in contact with the end of said collar, and also in contact with said cylinder and said flanged end, a dished washer having a central opening to allow the insulated conductor to pass through and a portion shaped to fit against said flanged end, a fitting to which said connecting terminal is to be attached, threaded means for effecting the connection.

6. For a shielded electrical system, an insulated conductor, a metal shielding casing surrounding said conductor, a connecting terminal for said casing having a collar of resilient material, a flanged end on said casing, a metal cylinder around said collar, a thin metallic washer located in contact with the end of said collar, and also in contact with said cylinder and said flanged end, a resilient metal element having a central opening to allow the insulated conductor to pass through and a portion shaped to fit against said flanged end, a fitting to which said connecting terminal is to be attached, threaded means for effecting the connection.

7. For a shielded electrical system, an insulated conductor, a close-fitting, thin-walled metal tubular casing around said insulated conductor, a terminal connection for said casing including a flared end on the casing, a cylindrical collar of compressible material around the end of said casing, an annular metal part around the outside of said collar, said part having inward flanges to retain said collar, said part further having an opening of greater diameter than said flared end, a metallic washer part adapted to contact said flared end and a threaded connecting part associated with said annular metal part.

8. For a shielded electrical system, an insulated conductor, a close-fitting, thin walled metal tubular casing around said insulated conductor, a terminal connection for said casing including a flared end on the casing, a cylindrical collar of compressible material around the end of said casing, an annular metal part around the outside of said collar, said part having inward flanges to retain said collar, said part further having an opening of greater diameter than said flared end, a metallic washer part adapted to contact said flared end and a connecting member having an internal flange and a female thread, an external flange on said annular metal part to co-operate with said internal flange.

9. A coupling construction for metal tubing including a flared end on said tubing, a cylindrical coiled spring element adapted to fit around said tubing, a metal housing around said spring element, said spring and said housing co-operating to provide a resilient support for said flared end, a fitting to which said coupling may be attached and means for accomplishing intimate connection of said coupling to said fitting.

10. For a shielded electrical system, an insulated conductor, a close-fitting, thin-walled metal tubular casing around said insulated conductor, a terminal connection for said casing including a flared end on the casing, a cylindrical collar of compressible material around the end of said casing, an annular metal part around the outside of said collar, a flexible metallic disc adapted to contact the outer side of said flared end and metal washer means adapted to contact the inner side of said flared end.

11. For a shielded electrical system, an insulated conductor, a tubular metal casing around said insulated conductor, a terminal connection for said casing including a flared end on the casing, a cylindrical collar of compressible material surrounding the end of said casing, an annular metal cover around said compressible material, said cover having an internal and an external flange at the end adjoining the end of the casing, a flexible metal element located at the end of said cylindrical collar and contacting the outside of said flared end and the internal flange of said cover and a threaded cylindrical member having an internal flange adapted to contact the external flange of said annular cover.

12. A claim in accordance with claim 11, and having a disc shaped part with an annular lip capable of engaging the inside of the flared end of said casing.

13. For a shielded electrical system, an insulated conductor, a tubular metal casing around said insulated conductor, a terminal connection for said casing including a flared end on the casing, a cylindrical collar of compressible material surrounding the end of said casing, an annular metal cover around said compressible material, said cover having an internal and an external flange at the end adjoining the end of the casing, a flexible metal element located at the end of said cylindrical collar and contacting the outside of said flared end and the internal flange of said cover, a threaded cylindrical member having an internal flange adapted to contact the external flange of said annular cover, a disc shaped part with an annular lip capable of engaging the inside of the flared end of said casing, a complementary threaded part for attachment with said threaded cylindrical member and a sealing element of resilient material adapted to be compressed between said disc shaped part and said complementary threaded part.

14. In an electrical device comprising an insulated electrical conductor surrounded by a metallic shield, means for attaching the device to an electrical appliance and for grounding the shield, the attaching means including a separable casing circumferentially surrounding an end of said shield and having cooperating clamping mechanism to secure its separable parts together; an annular metallic union extending between the shield and the casing and adapted to form an electrical bond therebetween, and a pair of resilient elements snugly retained in position within the casing, one yieldingly engaging the shield adjacent its end, the other lying in a position opposite to the end of said shield; the attaching means as a whole being characterized in that the annular metallic union is so positioned between the resilient elements as to be acted upon by them in opposite directions at least when the clamping mechanism is drawn up, whereby to insure the establishment and maintenance of an electrical ground connection between shield and casing under all conditions of service.

15. A shielded electrical conductor and coupling assembly including an insulated conductor, a thin walled metal shielding tube surrounding said conductor, a flared end on said tube, a sleeve of resilient material surrounding said tube adjacent said flare, an annular metallic sleeve around said resilient sleeve, a metallic member into which said conductor extends, means providing for metallic contact against the outside of said flare, a washer-like metallic element contacting the inside of said flare, a resilient non-metallic part adjacent said element, clamping means for urging said metallic sleeve and said metallic member into coupled relationship thereby applying pressure between said resilient sleeve and said tube and between said resilient part and said washer-like element, whereby an efficient electrical connection is maintained between said tube and said member while said tube is resiliently supported to prevent fatigue failure.

B. CURTIS GRIEB.